United States Patent [19]

Hongu et al.

[11] Patent Number: 4,689,357

[45] Date of Patent: Aug. 25, 1987

[54] VIBRATION ISOLATOR

[75] Inventors: Tatsuya Hongu, Tokyo; Toshio Suzuki, Tokyo; Yoshihiko Ogawa, Tokyo; Takeshi Itoh, Koshigaya, all of Japan

[73] Assignee: Nisshin Spinning Co., Ltd., Tokyo, Japan

[21] Appl. No.: 741,836

[22] Filed: Jun. 6, 1985

[30] Foreign Application Priority Data

Jul. 30, 1984 [JP] Japan .................. 59-157684

[51] Int. Cl.$^4$ ................. C08G 18/14; C08G 18/48
[52] U.S. Cl. .................... 521/176; 521/112; 521/137; 521/914; 528/76; 248/634; 260/DIG. 46
[58] Field of Search ............... 521/137, 112, 176, 914; 528/76; 248/634; 260/DIG. 46

[56] References Cited

U.S. PATENT DOCUMENTS

| | | | |
|---|---|---|---|
| 4,119,582 | 10/1978 | Matsubara et al. | 521/112 |
| 4,190,712 | 2/1980 | Flanagan | 521/137 |
| 4,302,552 | 11/1981 | Hongu et al. | 521/176 |
| 4,304,872 | 12/1981 | Tenhagen | 521/137 |

Primary Examiner—John Kight
Assistant Examiner—M. L. Moore
Attorney, Agent, or Firm—Sherman and Shalloway

[57] ABSTRACT

A vibration isolator composed of a low foam urethane elastomer having urethane bonds and a bulk density of 0.4–0.75 g/cm$^3$ which is prepared from the starting foamable liquid of urethane elastomer composed substantially of (a) a polyether polyol having an average number of functional groups of 2.5–4.5 and a number average molecular weight of 2000–3500, (b) a vinyl monomer-grafted polyol having an average number of functional groups of 2.5–4.0 and the graft ratio is 4–20% by weight, (c) a liquid polybutadiene polyol having hydroxyl terminal group(s), an average number of functional groups of 2.0–3.0 and a number average molecular weight of 2000–7000, (d) an organic polyisocyanate, (e) a chain extender

(f) a blowing agent, and (g) a urethanation catalyst, in such ratios that the NCO index is within the range of 90–110, and the concentration of the chain extender, based on the total amount of the five components of (a), (b), (c), (d) and (e), is $0.3 \times 10^{-3}$ to $1.5 \times 10^{-3}$ mol/g.

24 Claims, 4 Drawing Figures

Fig. 1

(unit: mm)

VIBRATION ISOLATOR

This invention relates to a vibration isolator that is effective in damping vibration or preventing the transmission of vibration, and particularly to a vibration isolator consisting of a low foam urethane elastomer which can be effectively used in damping vibrations that are set up under high loads or in isolating the transmission of vibration from the vibration source to the members that support said source.

It has been known hitherto to use as vibration isolators for damping or isolating vibration, particularly those mainly composed of natural rubber and synthetic rubbers. For example, a rubber vibration isolator is frequently used to prevent the transmission of the rotary and reciprocating motions of, for example, compressors, presses, etc. to their supporting beds. These vibration isolators are designed to achieve the isolating effect by transmitting the vibratory energy from the vibration-producing source to a rubbery elastic member where the isolation of the transmission of vibration is achieved by the deformation of said elastic member and internal loss.

In using this type of vibration isolator for the purpose of damping or isolating the transmission of vibration, the prevention of vibration or its transmission can be achieved by insertion of a vibration isolator (rubber vibration isolator) between the source of vibration and its supporting members, when the displacement by the vibration between said source and its supporting members takes place only in uniaxial direction, e.g., the direction of acceleration of gravity. However, the vibration of the vibratory source usually occurs in two or more axial directions, for example in triaxial directions with the direction of acceleration of gravity as one of the axes, and thus a vibratory source that is supported on a vibration isolator is in an extremely instable state as a result of the vibratory accelerations in directions other than the direction of acceleration of gravity. To wit, in the case of a vibratory source having a high center of gravity, there is the danger of its toppling. Again, it becomes impossible to secure its position as a result of a thrusting force in a horizontal direction incident to the vibration. In other words, it is difficult to firmly unite an elastic member such as a vibration isolator with a vibratory source or its supporting bed.

As a means for solving such difficulties, there has been conceived a method wherein the bottom and lower side surfaces of a rigid base such as a concrete sheet-like member are covered with a vibration isolator, and then the base is embedded in a recess of a supporting bed, the source of vibration being installed and fixed on said base. The vibratory source and the base can easily be firmly united by means of such binding hardwares as bolts. On the other hand, the base is held in the surface of the bed as a result of its having been embedded in a recess of the supporting bed. In this case the vibration isolator at the bottom of the base supports the load consisting of the vibratory source and the base, and the vibration isolator at the sides of the base and in contact with the sides of the recess counters the thrusting force of the vibration in the horizontal direction.

It was however found that a serious problem arose when the above means was employed. For example, because the vibration isolator at the bottom of the base is embedded in the recess in the bed surface, deformations in directions other than that resulting from the load in a perpendicular axis to the base and the bed surface are substantially constrained. Hence, under these conditions, the volumetric changes of the vibration isolator will be forced by the vibration of the base. On the other hand, the conventional vibration isolators which consist principally of natural rubber or synthetic rubbers have a dense structure, and thus difficulty is experienced in bringing about a change in their volume. Hence, the vibration isolator, being in a state in which its volumetric deformation is constrained, loses its functions as a vibration isolator.

In accordance with our experiment, when a square vibration isolator consisting principally of chloroprene rubber having a thickness of 25 mm and whose one side was 20 cm was compressed between flat plates in a free state without restraining its volumetric change, a compressive strength of 520 kg was required in compressing it by 1 mm, and a compressive strength of 1300 kg was required in compressing it by 2.5 mm. In this case, the spring constant between the strains of 4%–10% is calculated to be 5.2 tons/cm, but the spring constant rises to 20.8 tons/cm when the compression is carried out with constraint such as to cause a reduction in the volume by the compression. The rise in the spring constant reaches a value of as much as four times. It is thus impossible to achieve damping of vibration or prevention of the transmission of vibration by using the conventional vibration isolators in a state such as above-described.

The conventional vibration isolator also has the drawback that there is a change in its properties at the time of compression as a result of a change of its geometrical configuration. For example, when the aforementioned chloroprene rubber-type vibration isolator, which is a platelike member having the dimensions 20 cm×20 cm×25 mm is compressed while allowing its free deformation, the spring constant per unit area is 13 kg/cm between the strains 4%–10%, as hereinbefore indicated. However, when a member having the dimensions 50 cm×50 cm×25 mm is used, and the measurement is made in the same manner, the spring constant per unit area shows a value of 24 kg/cm, and the rise corresponds to 1.8 times. This is believed to be for the reason that in the case of the conventional vibration isolators there occurs a markedly different volumetric deformation depending upon the shape of the vibration isolator even when the compression is carried out while allowing the free deformation of the vibration isolator. This poses an exceedingly troublesome problem from the standpoint of designing a vibration isolator.

Our researches with the view of solving the problems indicated hereinbefore led to the discovery that a low foam urethane elastomer having a bulk density of 0.3–0.9 g/cm$^3$ that is obtained by reacting, in the presence of water as the blowing agent,
  (i) a polyhydric alcohol having an average number of functional groups of 2.5–3.5 and a number average molecular weight of about 4500–about 8500,
  (ii) an organic polyisocyanate, and
  (iii) a chain extender
in such a ratio that the NCO index is 90–110 and the concentration of the chain extender, based on the total weight of the three components (i), (ii) and (iii) is 0.4×10$^{-3}$–2.0×10$^{-3}$ equivalent/g was suitable as a material for damping vibration or isolating the transmission of vibration under high load, and proposed the same (cf. U.S. Pat. No. 4302552). However, when the previously proposed low foam urethane elastomer having a low density of 0.3–0.75 g/cm$^3$ is used to form a vibration isolator having a spring constant of no less than 0.5 t/cm, closed cellular property of the foamed body substantially disappears, permanent compression set becomes remarkably high, and furthermore weatherability and durability are lost due to its poor waterproofness and alkali resistance. Thus there arises a problem that it is difficult to obtain a substantially useful vibration isolator in that case.

Accordingly we have engaged in concentrated studies with the view to provide a foamed urethane elastomer which has a low bulk density but with no substantially increased permanent compression set, and furthermore exhibits excellent durability and weatherability, and as the result completed the present invention.

Thus according to the present invention, a vibration isolator composed of a foamed urethane elastomer having urethane bonds and a bulk density of 0.4–0.75 g/cm$^3$ which is prepared from the starting foamable liquid of urethane elastomer composed substantially of (a) a polyether polyol having an average number of functional groups of 2.5–4.5 and a number average molecular weight of 2000–8500, (b) a vinyl monomer-grafted polyol having an average number of functional groups of 2.5–4.0, and the graft ratio is 4–20% by weight, (c) a liquid polybutadiene polyol having an average number of functional groups of 2.0–3.0, a number average molecular weight of 2000–7000, and hydroxyl terminal group(s), (d) an organic polyisocyanate, (e) a chain extender (f) a blowing agent, and (g) a urethanation catalyst, in such ratios that the NCO index is within the range of 90–110, and the concentration of the chain extender, based on the total amount of the five components of (a), (b), (c), (d) and (e), is $0.3 \times 10^{-3} - 1.5 \times 10^{-3}$ mol/g, is provided.

The polyol polyether (a) to be used as one of the polyol components in the preparation of the urethane elastomer of the present invention has an average number of functional groups of 2.5–4.5, and a number average molecular weight of 2000–8500. When the average number of functional groups in the employed polyether polyol is less than 2.5, the foamed urethane elastomer obtained therefrom shows increased permanent compression set. Conversely when the average number of functional groups exceeds 4.5, the resulting elastomer shows a tendency to become harder, and furthermore the possibility of its rupture increases when it is exposed to the vibratory compression. Thus, the preferred average number of functional groups is 2.5–4.5, particularly 2.8–4.0.

Again, when the number average molecular weight of the polyether polyol (a) is less than 2,000, a foamed urethane elastomer having a high vibration energy-absorbing characteristics can hardly be obtained. Conversely, when it exceeds 8,500, the resulting urethane elastomer shows deterioration in its elastic properties, tends to produce plastic deformation, and shows a strong tendency particularly for increased permanent compression set. Thus it is desirable for the polyether polyol to be used in the present invention to have the number average molecular weight normally ranging from 2000–8500, particularly 3000–6500.

As such polyether polyol (a), those normally used in the preparation of urethane elastomers can be optionally used. More specifically, such polyether polyols obtained by addition-polymerizing $C_2$-$C_4$ lower alkylene oxides, such as ethylene oxide, propylene oxide, etc. to $C_2$-$C_6$ aliphatic polyhydric alcohols such as glycerin, trimethylolpropane, etc. or to active hydrogen-containing compounds having active hydrogen atoms such as ethylenediamine, diaminodiphenylmethane, etc. may be named. Typical examples of such polyether polyols (a) include glycerin/propylene oxide/ethylene oxide copolymerized adduct (average number of functional groups=3.0, number average molecular weight=3000), propylene glycol/propylene oxide/ethylene oxide copolymerized adduct (average number of functional groups=2.0, number average molecular weight=4800), glycerin/pentaerythritol/propylene oxide/ethylene oxide copolymerized adduct (average number of functional groups=3.7, number average molecular weight=5700), etc.

One of the characteristic features of the present invention resides in that, in combination with the above polyether polyol (a), a vinyl monomer-grafted polyol (b) having an average number of functional groups of 2.5–4.0 and the graft ratio of 4–20% by weight, and a liquid polybutadiene polyol (c) having an average number of functional groups of 2.0–3.0, a number average molecular weight of 2000–7000, and hydroxyl terminal group(s), are used as the polyol component for composing the foamed urethane elastomer.

The "vinyl monomer-grafted polyols" to be used in the present invention (hereinafter may be referred to as the graft polyols) (b) signifies modified polyols prepared by in situ radical polymerization of vinyl monomers in the presence of ordinary polyols, which per se are known as the polyol component for producing high elasticity urethane foams (e.g., Japanese Patent No. 447628, U.S. Pat. No. 3033841, U.K. Patent No. 874130, German Patent Nos. 1077430, 1105179, 1081917, and 1111394, Laid-open Japanese Patent Publication No. 93729/81). According to the invention, of such graft polyols, particularly those specific graft polyols having an average number of functional groups of 2.5–4.0 and a graft ratio of 4–20% by weight are used.

When the average number of functional groups of the graft polyol employed is less than 2.5, the resulting low foam urethane elastomer shows excessively great permanent compression set, and therefore is not appropriate. Conversely, when it exceeds 4.0, the product urethane elastomer shows a tendency to be hardened. The preferred range of the average number of functional groups of the graft polyol is 3.0–3.8. Again, when the graft ratio of the graft polyol is less than 4% by weight, permanent compression set is aggravated. Conversely, when it exceeds 20% by weight, the viscosity of the liquid rises to markedly deteriorate the moldability. Thus it is convenient that the graft ratio of graft polyol ranges 4–20% by weight, particularly 5–17% by weight. The term "graft ratio" used herein means, of the total vinyl monomer added, the ratio of the vinyl monomer graft polymerized to the polyol, to the weight of said polyol.

As the polyols to serve as the trunks of such graft polyols (b), those having a number average molecular weight of 2500–8500, preferably 4000–7000, and a hydroxyl value of 20–67, preferably 24–42, are advantageously used. For instance, polyalkyleneether glycol having a number average molecular weight of 4800, which is obtained by addition polymerizing ethylene oxide and/or propylene oxide to glycerin, may be used.

As the vinyl monomers to be grafted to these polyols, the following may be named for example: olefins such as styrene, vinyltoluene, 1-butene, 2-hexene, 1,4-hexadiene, 1,3-butadiene and 3-pentene; vinyl halides such as vinyl chloride and vinylidene chloride; ethylenic unsaturated carboxylic acids, such as acrylic acid and methacrylic acid, or their derivatives (e.g., alkyl esters); vinyl acetate; acrylonitrile; etc. They may be used either singly or in combination of more than one kind of the monomers.

The grafting of the above vinyl monomer or monomers to the above polyol can be achieved by radical polymerizing the vinyl monomer(s) in the presence of the polyol according to the method known per se. As the useful radical polymerization catalyst, for example peroxide-type, azo-type or redox-type polymerization initiators or metal compound catalysts, etc., may be named. Thus obtained graft polyols can normally have the number average molecular weight of 2500–8500, preferably 4000–7000.

As the particularly preferred graft polyols for the present invention, for example, that obtained by graft polymerizing acrylonitrile and styrene to the polypropyleneether glycol having a number average molecular weight of about 5100 and an average number of functional groups of about 3, in an autoclave at 120° C. for 8 hours, using as the polymerization initiator azobisisobutyronitrile, may be named.

"Liquid polybutadiene polyol" (c) to be used in combination with above graft polyol signifies liquid butadiene homopolymers or copolymers having terminal reactive hydroxyl group(s), particularly allyl-type primary hydroxyl group(s), which per se have been known (e.g., see U.S. Pat. Nos. 3427366 and 3674743). They can be prepared by, for example, radical addition polymerizing 1,3-butadiene alone or 1,3-butadiene and no more than 75% by weight of the total monomer of $C_2$–$C_{12}$ ethylenically unsaturated monomers such as styrene, acrylonitrile, etc., in the presence of hydrogen peroxide as the polymerization catalyst.

According to the present invention, of such liquid polybutadiene polyols, particularly those having an average number of functional groups of 2.0–3.0 and a number average molecular weight of 2000–7000 are used. When the average number of functional groups in the liquid polybutadiene polyol employed is less than 2.0, product of high spring constant is difficult to be obtained. The product furthermore shows a tendency to have larger permanent compression set. Also the miscibility thereof with the polyol (a) and graft polyol (b) to be used as mixed therewith is impaired, adversely affecting the stable production of the product and rendering the product non-uniform. Conversely, when it exceeds 3.0, the product lacks elasticity, becomes brittle, is void of improvement in waterproofness and alkali resistance, and shows markedly deteriorated fatigue resistance.

Thus the convenient average number of functional groups of the liquid polybutadiene polyol is within the range of 2.0–3.0, particularly that of 2.1–2.8 being the optimum. Again, when the number average molecular weight of the liquid polybutadiene polyol is less than 2,000, the strength- and elongation-improving effect used as the norms of waterproofness and alkali resistance is reduced, and the fatique resistance and permanent compression set show strong tendency for marked deterioration. On the other hand, when it exceeds 7,000, the viscosity of the liquid becomes excessively high, impairing its blendability with polyisocyanate (d). Thus the product elastomer exhibits not only low tensile strength, but fails to have a high spring constant, and shows poor closed cell-forming ability. Thus it is appropriate for the liquid polybutadiene polyol to have a number average molecular weight of 2000–7000, preferably 2400–5000.

Furthermore, it is desirable that the liquid polybutadiene polyol to normally have a hydroxyl content of 0.5–1.0 milliequivalent/gram, and an iodine value of 400–500.

As the particularly preferred liquid polybutadiene polyol, for example, a hydroxyl-terminated butadiene homopolymer having an average number of functional groups of 2.2–2.4 and a number average molecular weight of about 2,800 (e.g., poly bd R-45 HI manufactured by ARCO Chemical Co.), a hydroxyl-terminated butadiene/styrene copolymer having an average number of functional groups of 2.2–2.4 and a number average molecular weight of about 3,500 (e.g., poly bd CS-15 manufactured by ARCO Chemical Co.), and a hydroxyl-terminated butadiene/acrylonitrile copolymer having an average number of functional groups of 2.5–2.8 and a number average molecular weight of about 4500 (e.g., poly bd CN-15 manufactured by ARCO Chemical Co.) may be named.

The blend ratio of the above-mentioned three types of polyol components (a), (b) and (c) is variable over a wide range, according to the physical properties required for the ultimately produced urethane elastomer. Normally, it is convenient to select the blend ratio from the below-specified ranges, based on the total weight of the three components (a), (b) and (c).

| Polyol component | Normal range (wt %) | Preferred range (wt %) | Optimum range (wt %) |
| --- | --- | --- | --- |
| (a) | 15–95 | 20–95 | 50–90 |
| (b) | 1–60 | 1.5–40 | 2–30 |
| (c) | 1–50 | 2–40 | 3–30 |

Also the mixing ratio of the graft polyol (b) to the polybutadiene polyol (c), (b)/(c) by weight, is normally from 1/0.5 to 1/1.5, preferably from 1/0.8 to 1/1.2. The mixing ratio of the polyether polyol (a) to the polybutadiene polyol, (a)/(c) by weight, is advantageously within the range of 3/1–15/1, preferably 4/1–10/1.

The urethane elastomer obtained by the combined use of vinyl monomer-grafted polyol (b) and liquid polybutadiene polyol (c) in accordance with the present invention is found to achieve the novel effects unattainable with conventional elastomers, i.e., it gives a high spring constant, showing no degradation in tensile strength due to decrease in bulk density, even under the conditions of high loads and restricted deformation, and furthermore its permanent compression set is small, and its variations in strength and elongation shown in the waterproofness and alkali resistance tests are small.

Preferred combination of the graft polyol (b) and the liquid polybutadiene polyol (c) for achieving the high quality closed cells, low variations in strength and elongation in the waterproofness and alkali resistance tests, excellent vibration-absorbing ability and appropriate spring constant and elongation, which are obtained as the novel, synergistic effect of the concurrent use of graft polyol and liquid polybutadiene polyol characteristic to the present invention, is that of the graft polyol having a graft ratio of 10–15%, a number average molecular weight of 5000–7000 and an average number of functional groups of 3.0–3.8, with the liquid polybutadiene polyol having a number average molecular weight of 2500–4800 and an average number of functional groups of 2.2–2.8, at a blend ratio within 1:0.5 to 1:1.5, particularly 1:0.8 to 1:1.2 as the weight ratio of the graft polyol to the liquid polybutadiene polyol. Furthermore, the best synergistic effect is obtained when the above liquid polybutadiene polyol is blended in an amount of 3–30% by weight based on the total weight of the three types of polyol components (a), (b) and (c).

As the organic polyisocyanate (d) to be reacted with the above polyol components (a), (b) and (c), any of those normally used for the production of urethane elastomers can be used. Examples are such polyisocyanates as 4,4'-diphenylmethanediisocyanate (M.D.I.), naphthylenediisocyanate, tolylenediisocyanate and hexamethylenediisocyanate, which may be used either alone or in combination. The polyisocyanate (d) may also be used in the form of a precursor obtained by advance condensation with aforesaid polyhydric alcohol, i.e., a pre-polymer or a semi-prepolymer.

In either case, the amount of the organic polyisocyanate (d) is variable within the range around stoichiometric equivalent to the total active hydrogen-containing components (polyol components, chain extender, etc.) which are to react with the isocyanate residual groups (-NCO) present in the foamable starting liquid of urethane elastomer, ±10%, i.e., in terms of NCO index, within the range of 90–110, preferably 95–105.

The chain extender (e) to be used for the formation of urethane elastomer in the present invention reacts with the organic polyisocyanate (d) to form, by means of a urethane bond or a urea bond, a hard segment that is principally an inter-hydrogen bond. It is thus an important factor controlling the elasticity characteristics of the product urethane elastomer. According to the invention, relatively low molecular weight, substantially difunctional active hydrogen-containing compounds are advantageously used as the chain extender. Examples of such a chain extender (e) includes $C_2$–$C_{10}$ diols such as ethylene glycol, propylene glycol, propanediol, butanediol, hydroquinone and hydroxyethylquinone ether; and amines such as methylenebis(o-chloroaniline), quadrol, ethylenediamine and triethanolamine. They may be used either alone or in combination.

According to our studies, in the combined use of the chain extender (e) with aforesaid polyol components (a), (b) and (c), it is found appropriate to use the chain extender (e) at a concentration within the range of $0.3 \times 10^{-3}$ mol/g to $1.5 \times 10^{-3}$ mol/g, based on the total amount of the five components of (a), (b), (c), (d) and (e). At a concentration lower than that, the chain-extending effect is insufficient, and the resulting foamed urethane elastomer generally shows the tendency to have low strength. Conversely, at the chain extender concentration higher than $1.5 \times 10^{-3}$ mol/g, interhydrogen bonds increases excessively, and as the result the resulting elastomer tends to become very hard, although is improved in strength. Such is rather undesirable for the product's utility as in the present invention, wherein the product is exposed to permanent compression set and repetitive compression stress. The preferred concentration range of the chain extender is thus from $0.5 \times 10^{-3}$ mol/g to $1.2 \times 10^{-3}$ mol/g.

As the urethanation catalyst (g), any of those normally used in urethanation reaction, for example, tertiary amine compounds, organometal compounds, etc. may be used. Specific examples include triethylenediamine, diazabicycloundecene, n-methylmorpholine, N,N-dimethylethanolamine; tin octylate and dibutyl tin laurate. The amount of the catalyst is not critical, which is variable over a wide range depending on the desired reaction rate. It needs be suitably adjusted, however, according to the degree of foaming in the urethane elastomer and ambient conditions (temperature, humidity, etc.). Adjustment of the amount of catalyst has been a routine practice in the art, and the selection of suitable amount should be easy.

According to the present invention, foamed urethane elastomers are formed. As the blowing agent (f) to be used for the production of the foamed bodies, conventional blowing agents, such as water and halogenated hydrocarbons (e.g., trichlorofluoromethane, methylene chloride, etc.) may be used. Although the degree of foaming of the urethane elastomer desired in the present invention is not strictly limited, it is important that the product should be relatively lowly foamed compared with ordinary urethane foams. Normally it is advantageous to achieve the degree of foaming, as expressed in terms of bulk density, ranging from 0.4–0.75 g/cm$^3$, preferably 0.55–0.7 g/cm$^3$. The amount of the blowing agent (f) and/or the degree of foaming can be regulated to make the bulk density of the resulting urethane elastomer a value within the above-specified range.

Besides the foregoing, the starting foamable liquid of urethane elastomer in accordance with the present invention may contain, if required, a foam stabilizer (e.g., silicone surfactant), pigment(s) (e.g., carbon black) etc., as normally practiced in the art.

Those components of the starting foamable liquid of urethane elastomer as above-described are intimately mixed immediately before the use accoding to the accepted practice, poured into a suitable mold, foamed and hardened. This foaming and hardening can normally be performed at room temperature, but if necessary may be practiced under heating to a temperature up to about 70° C. The foaming and hardening terminate within about 1 to 2 hours, and whereupon the elastomer is released from the mold.

A vibration isolator consisting of a low foam urethane elastomer can be thus obtained. Substantially all the foams in the low foam urethane elastomer thus molded are closed cells. As the desirable physical properties to be exhibited by that elastomer, the following may be named. (The methods of measurement of those physical properties will be described later).

(1) Bulk density: 0.4–0.75 g/cm$^3$, preferably 0.5–0.7 g/cm$^3$
(2) Permanent compression set: not more than 15%, preferably not more than 5%
(3) Spring constant: at least 0.5 ton/cm, preferably 0.7–5 tons/cm
(4) Tensile strength: at least 3.0 kg/cm$^2$, preferably at least 10 kg/cm$^2$
(5) Elongation: 20–500%, preferably 100–200%
(6) Waterproofness: within ±15% in tensile strength variation, preferably within ±5%; within ±15% in elongation variation, preferably ±5%
(7) Alkali resistance: within ±15% in tensile strength variation, preferably ±5%; within ±15% in elongation variation, preferably ±5%
(8) Fatigue resistance: the amount of fatigue not more than 1.5 mm, preferably not more than 0.2 mm (9) Closed cell forming ratio: at least 90%, preferably 99-100%

Furthermore, the vibration isolator consisting of the low foam urethane elastomer provided by the present invention exhibits very little changes in spring constant and hardness which are caused by temperature changes, and also excellent weatherability. Therefore, the isolator can be advantageously used outdoors where the fluctuation in temperatures is especially great.

The vibration isolator of the present invention demonstrates its superior effects when it is intimately adhered to the base supporting the source of vibration, for example by integrally molded and foamed with the concrete block serving as the base. Or, the isolator may be molded separately from the base and then intimately adhered to the base, whereby fixing the source of vibration and effectively achieving isolation of the vibration. Namely, it may be adhered to the bottom of base with an adhesive, or molded into a box form into which the base is to be accommodated.

The base thus provided with the low foam urethane elastomer covering layer, which is the vibration isolator of the present invention, may be fitted in a recess on the floor surface on which the source of vibration is to be installed. The recess may be formed in advance in the floor surface. Or, the base provided with the polyurethane elastomer covering layer may be installed on a flat and smooth floor, and thereafter its sides may be packed with concrete, asphalt, or the like to form the recess. It is also possible to temporarily lift the covered base from the floor level, and to pack its bottom and side portions with concrete, asphalt, or the like. As still another alternative, a recess may be provided in advance between an uncovered base and the floor surface, and the starting foamable liquid of the urethane elastomer may be poured into said space to be molded and foamed. In this case the polyurethane elastomer is integrally molded both with the base and the supporting floor surface, achieving a very strong adhesion.

The vibration isolator of the present invention can be used in all areas of industry for the purpose of isolating vibration or absorption of sound that accompany vibration. For example, conceivable applications are its installation on the bottom of a punch press for stamping out metals or at the underside of a compressor, or for isolating the vibration of air conditioning equipments installed on floor surface.

Besides its utility as the vibration isolator for bridges under high loads of bridge piers of superhighway and incessant vibrations of traffic organs such as motor cars, the isolator can be conveniently applied to the peripheries or side walls of high load apparatuses such as LPG tanks, for prevention of vibration of such a tank itself or as a precautionary means for earthquakes; or used for prevention of vibration of peripheral pipings caused by the liquid passage or for absorbing the impact of liquid passage.

Hereinafter the present invention will be explained in further details referring to working examples and controls. The measurements of the physical properties set forth in the present specification and claims were performed by the below-described methods.

(1) Bulk density:

Measured in accordance with JIS Z 8807, "Method of measurement from volume".

(2) Permanent compression set:

Measured in accordance with JIS K 6301 "10, Permanent Compression Set Test".

(3) Spring constant:

Measured in accordance with JIS K 6385 "5. Static Spring Constant Test". (A 10 cm×10 cm×2.5 cm test specimen is subjectd to a pressure of up to 425 kg, and the spring constant is determined between 100-400 kg on the load displacement curve.)

(4) Tensile strength and elongation

Measured in accordance with JIS K-6301, with Dumbbell test pieces No. 1 by "3. Methods of Tensile Tests".

(5) Waterproofness

The same Dumbbell test piece No. 1 used in the tensile strength test is immersed in distilled water or ion-exchange water for 96 hours, lightly wiped, and immediately subjected to the tensile strength test. The variation from the value before the aging is thus determined.

(6) Alkali resistance

The same test method as that in above waterproofness is employed except that the immercing liquid is a 1% (caustic potash/caustic soda=1:1) aqueous solution, and the immersing temperature is 50° C.

(7) Fatigue resistance

Measured in accordance with SRIS (Standard Rating of Japan Rubber Association) 3502. (Test conditions are: precompression amount 5 mm, vibration amplitude 4 mm, vibration frequency 5 Hz, repetition $1\times10^6$ times, and the size of test piece, 50×50×25 mm)

(8) Closed cell forming ratio

Measured in accordance with ASTM D 2856 A: expressed by percentile values, to volume of disc sample of 25 mm in diameter and 25 mm in thickness of the volume of air replaced by the same sample in a hermetically sealed room.

EXAMPLE 1

| Composition of liquid A | Part by weight |
| --- | --- |
| Polyether polyol (I) (glycerin/propylene oxide/ ethylene oxide copolymerized adduct average number of functional groups = 3, number average molecular weight = 3000) | 40 |
| Polyether polyol (II) (glycerin/pentaerythritol/ propylene oxide/ethylene oxide copolymerized adduct average number of functional groups = 3.7 number average molecular weight = 5,700) | 35 |
| Graft polyol [a polymer polyol obtained by graft polymerizing acrylonitrile and styrene to glycerin/propylene oxide/ethylene oxide copolymerized adduct (number average molecular weight = 5100), in the presence of azobisisobutyronitrile (polymerization initiator) average number of functional | 10 |

-continued

| | |
|---|---|
| groups = 3 | |
| graft ratio = 10% | |
| number average molecular weight = 6000] | |
| Hydroxyl-terminated liquid polybutadiene homopolyol (average number of functional groups = 2.5 number average molecular weight = 2750 hydroxyl content = 0.7 milliequivalent/g iodine value = 420) | 15 |
| Ethylene glycol | 7 |
| Water | 0.53 |
| Triethylenediamine | 0.7 |

| Composition of liquid B | NCO index |
|---|---|
| Polyisocyanate/polyol prepolymer [isocyanate-terminated precursor of 4,4'-diphenylmethanediisocyanate and a copolymerized adduct of glycerin/propylene oxide/ethylene oxide having number average molecular weight of 6500 (average number of functional groups = 6300); free NCO content = 16 wt %) | 100 |
| Physical properties: | |
| Bulk density: | 0.65 g/cm$^3$ |
| Spring constant: | 1.15 tf/cm.100 cm$^2$ |
| Permanent compression set: | 1.0% |
| Tensile strength: | 15.0 kg/cm$^2$ |
| Waterproofness | |
| Tensile strength variation: | −0.9% |
| Elongation variation: | −0.3% |
| Alkali resistance | |
| Tensile strength variation: | −0.4% |
| Elongation variation: | −0.2% |
| Fatigue strength: amount of fatigue | 0.11 mm |
| Closed cell foaming property: | closed cell forming ratio 100% |

EXAMPLE 2

| Composition of liquid A | Part by weight |
|---|---|
| Polyether polyol (II) (glycerin/pentaerythritol/ propylene oxide/ethylene oxide copolymerized adduct average number of functional groups = 3.7 number average molecular weight = 5700) | 90 |
| Graft polyol [a polymer polyol obtained by graft polymerizing acrylonitrile and styrene to glycerin/propylene oxide/ ethylene oxide copolymerized adduct (number average molecular weight = 5100), in the presence of azobisisobutyronitrile (polymerization initiator); average number of functional groups = 3 graft ratio = 15% number average molecular weight = 6500] | 3 |
| Hydroxyl-terminated liquid polybutadiene homopolyol (average number of functional groups = 2.2 number average molecular weight = 4800 hydroxyl content = 0.5 milliequivalent/g iodine value = 500) | 3 |
| Ethylene glycol | 5.7 |
| Water | 0.48 |

-continued

| | |
|---|---|
| Triethylenediamine | 0.7 |

| Composition of liquid B | NCO index |
|---|---|
| Polyisocyanate/polyol prepolymer [an isocyanate-terminated precursory condensation product of 4,4'-diphenylmethanediisocyanate and glycerin/propylene oxide/ethylene oxide copolymerized adduct (number average molecular weight = 6500) free NCO content = 16 wt %] | 100 |
| Physical properties: | |
| Bulk density: | 0.65 g/cm$^3$ |
| Spring constant: | 0.95 tf/cm/100 cm$^2$ |
| Permanent compression set: | 4% |
| Tensile strength: | 14.5 kg/cm$^2$ |
| Elongation: | 130% |
| Waterproofness | |
| Tensile strength variation: | −4.5% |
| Elongation variation: | −4.2% |
| Alkali resistance: | |
| Tensile strength variation: | −2.3% |
| Elongation variation: | −4.5% |
| Fatigue resistance: amount of fatigue, | 0.15 mm |
| Closed-cell foaming property: | closed cell forming ratio 99.9% |

Control 1

| Composition of liquid A | Part by weight |
|---|---|
| Polyether polyol (glycerin/propylene oxide/ ethylene oxide copolymerized adduct average number of functional groups 3, number average molecular weight = 6500) | 100 |
| Ethylene glycol | 9.7 |
| Water | 0.58 |
| Triethylenediamine | 0.7 |

| Composition of liquid B | NCO index |
|---|---|
| Polyisocyanate/polyol prepolymer (an isocyanate-terminated precursory condensation product of 4,4'-diphenylmethanediisocyanate with above polyether polyol; free NCO content = 16 wt %) | 100 |
| Physical properties | |
| Bulk density: | 0.63 g/cm$^3$ |
| Spring constant: | 0.98 tf/cm.100 cm$^2$ |
| Permanent compression set: | 34% |
| Tensile strength: | 22.3 kg/cm$^2$ |
| Elongation | 78% |
| Waterproofness | |
| Tensile strength variation: | −18.8% |
| Elongation variation: | −25.0% |
| Alkali resistance | |
| Tensile strength variation: | −35.2% |
| Elongation variation: | −35.0% |
| Fatigue resistance: amount of fatigue, | 1.5 mm |
| Closed cell foaming property: | closed cell forming ratio 88.5% |

Control 2

| Composition of liquid A | Part by weight |
|---|---|
| Polyether polyol (I) (glycerin/propylene oxide/ ethylene oxide copolymerized adduct average number of functional groups = 3 number average molecular | 40 |

| -continued | |
|---|---|
| weight = 3000) | |
| Polyether polyol (II) | 30 |
| (glycerin/pentaerythritol/ | |
| propylene oxide/ethylene oxide | |
| copolymerized adduct | |
| number average molecular | |
| weight = 5700) | |
| Graft polyol | 30 |
| [a polymer polyol obtained by | |
| graft polymerizing acrylonitrile and | |
| styrene to glycerin/propylene oxide/ | |
| ethylene oxide copolymerized adduct | |
| (number average molecular weight = 5100), | |
| in the presence of azobisisobutyronitrile | |
| (polymerization initiator); | |
| average number of functional | |
| groups = 3 | |
| graft ratio = 15% | |
| number average molecular | |
| weight = 6000] | |
| Ethylene glycol | 7 |
| Water | 0.53 |
| Triethylenediamine | 0.7 |

| Composition of liquid B | NCO index |
|---|---|
| Polyisocyanate polyol prepolymer | 100 |
| [an isocyanate-terminated | |
| precursory precondensation product of | |
| 4,4'-diphenylmethanediisocyanate | |
| with glycerin/propylene oxide/ | |
| ethylene oxide copolymerized adduct | |
| (number average molecular weight = 6500, | |
| average number of functional groups = 3); | |
| free NCO content = 16 wt %] | |
| Physical properties | |
| Bulk density: | 0.63 g/cm³ |
| Spring constant: | 0.95 tf/cm · 100 cm² |
| Permanent compression set: | 18.6% |
| Tensile strength | 10.2 kg/cm² |
| Elongation: | 131% |
| Waterproofness | |
| Tensile strength variation: | −19.5% |
| Elongation variation: | −17.2% |
| Alkali resistance | |
| Tensile strength variation: | −17.6% |
| Elongation variation: | −18.3% |
| Fatigue resistance: amount of fatigue, | 1.3 mm |
| Closed cell foaming property: | closed cell forming ratio, 93.5% |

Control 3

| Composition of liquid A | Part by weight |
|---|---|
| Polyether polyol (I) | 40 |
| (glycerin/propylene oxide/ | |
| ethylene oxide copolymerized | |
| adduct, | |
| average number of functional | |
| groups = 3 | |
| number average molecular | |
| weight = 3000) | |
| Polyether polyol (II) | 30 |
| (glycerin/pentaerythritol/ | |
| propylene oxide/ethylene oxide | |
| copolymeized adducts | |
| average number of functional | |
| groups = 3.7 | |
| number average molecular | |
| weight = 5,700) | |
| Hydroxyl-terminated liquid poly- | 30 |
| butadiene homopolyol | |
| (average number of functional | |
| groups = 2.5 | |
| number average molecular | |
| weight = 2750 | |
| hydroxyl content = 0.7 | |
| milliequivalent/g | |
| iodine value = 420) | |

| -continued | |
|---|---|
| Ethylene glycol | 7 |
| Water | 0.53 |
| Triethylenediamine | 0.7 |

| Composition of liquid B | NCO index |
|---|---|
| Polyisocyanate/polyol prepolymer | 100 |
| [an isocyanate-terminated | |
| precursory condensation product | |
| of 4,4'-diphenylmethanediisocyanate | |
| with glycerin/propylene oxide/ | |
| ethylene oxide copolymerized adduct | |
| (number average molecular weight = 6500, | |
| average number of functional | |
| groups = 3); | |
| free NCO content = 16 wt %] | |
| Physical properties | |
| Bulk density: | 0.63 g/cm³ |
| Spring constant: | 0.64 tf/cm.100 cm² |
| Permanent compression set: | 20.4% |
| Tensile strength: | 11.8 kg/cm² |
| Elongation: | 155% |
| Waterproofness | |
| Tensile strength variation: | −18.3% |
| Elongation variation: | −17.4% |
| Alkali resistance: | |
| Tensile strength variation: | −15.4% |
| Elongation variation: | −17.7% |
| Fatigue resistance: amount of fatigue, | 1.2 mm |
| Closed cell foaming property: | closed cell forming ratio 93.7% |

REFERENTIAL EXAMPLE 1

Manufacture of vibration isolating joint member for bridge piers

Figure 1:
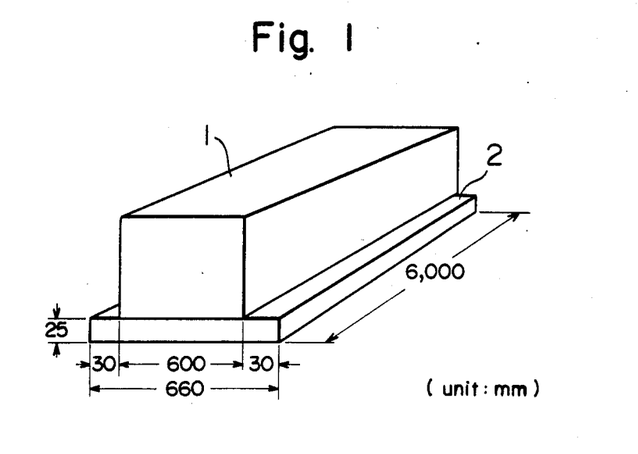

As illustrated in attached FIG. 1, below the bottom plane of a 600 mm × 6000 mm × 600 mm concrete block (1), a mixture of the liquids A and B specified in Example 1 was poured to form a 25 mm-thick, 660 mm-wide an 6000 mm-long urethane elastomer layer (2). Thus a joint member A for bridge piers was obtained.

This member was compressed with Amsler compressive testing machine, and the strain-stress relationship of the urethane elastomer was measured. As the result, the straight line (1) shown in attached FIG. 2 was obtained.

For comparison, the liquids A's and B's as specified in Controls 1 and 3, respectively, were mixed and used to form the joint members B and C in the similar manner. Again in the identical manner the strain-stress relationships were measured as to the elastomers, and respectively the curves (2) and (3) of FIG. 2 were obtained.

Figure 2:
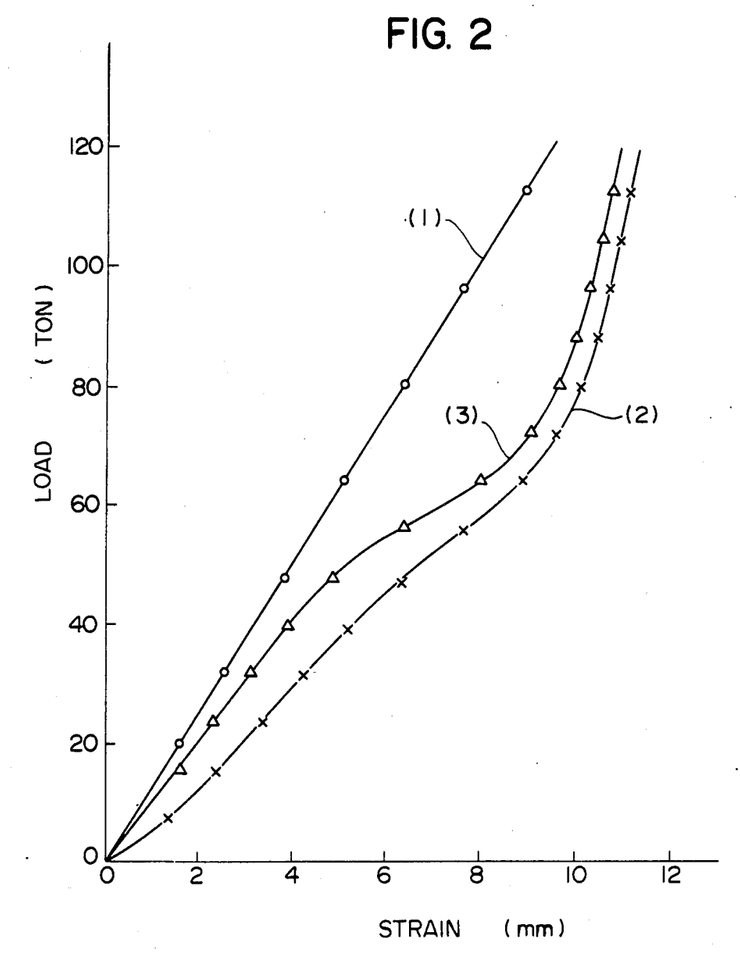

As is apparent from the test result, at the region of 5–8 mm strain, the curves (2) and (3) have an inflection point, and the joint members B and C show plastic deformation as if the air layers in the elastomers were not independent. In contrast thereto, the joint member A having 100% closed cell foaming property performs perfect elastic deformation, as is apparent from the straight line (1).

This fact coincides also with the fact that the size of permanent compression set was joint member A < joint member B < joint member C.

Figure 3:
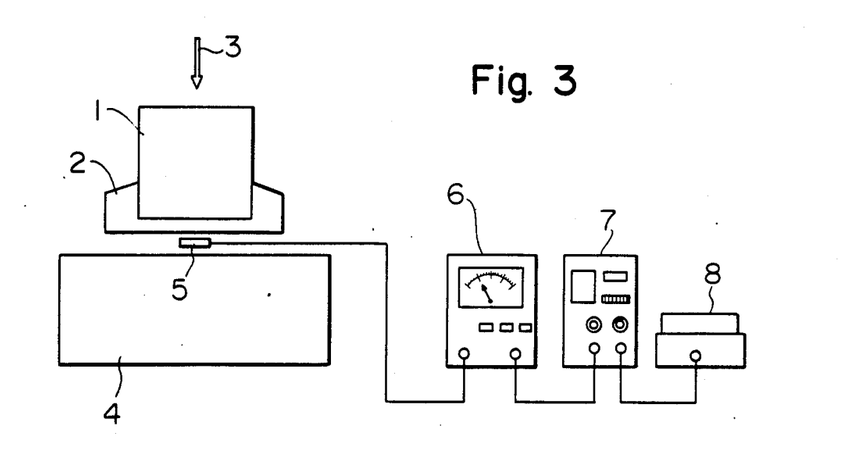

As shown in FIG. 3, then, impact of a predetermined size was exerted on the center of the concrete block (1) of the joint member for bridge piers, with a hammer, from the direction indicated with the arrow 3, and the vibration acceleration transferred to the concrete foundation (4) (8 m in length, 1.2 m in width and 1 m in height, at 23° C.) via the vibration isolator (2) was received with a sensor. The vibration caused by the impact was thus inputted into the signal processor (7)

(manufactured by San-ei Sokki Co.) through the vibration amplifier (6), so as to record the waveforms with X-Y recorder (8). Thus obtained charts are shown in FIG. 4.

Figure 4:
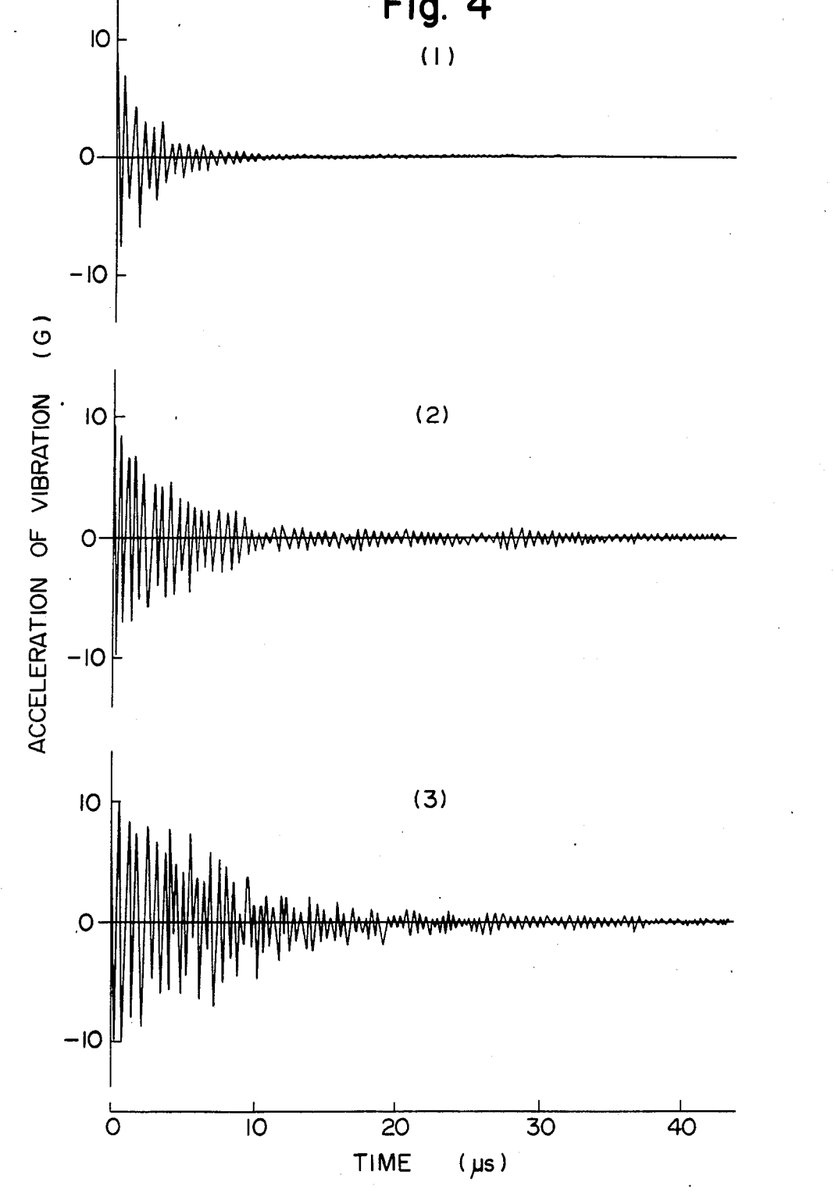

In FIG. 4, (1) through (3) are the data of the members corresponding to those of (1) through (3) of FIG. 2.

From the charts it can be understood that the vibration isolator of Example 1 achieves the quickest attenuation or isolation of the vibration. Whereas, the vibration isolators of Controls 1 and 3 consumed more than three times the time required for the vibration isolator of Example 1 to reduce the acceleration to the level of 0.5 gal. Thus it is very clear that the vibration-isolating effect of the isolator of this invention is excellent.

What we claim is:

1. A vibration isolator composed of low foam urethane elastomer having urethane bonds and a bulk density of 0.4–0.75 g/cm$^3$, a permanent compression set of not more than 15%, a spring constant of at least 0.5 ton/cm, a tensile strength of at least 3.0 kg/cm$^2$, an elongation of 20–500%, a fatique resistance, in terms of the amount of fatigue, of not more than 1.5 mm, and a closed cell forming ratio of at least 90%, and exhibiting excellent waterproofness and alkali resistance, said urethane elastomer being prepared by reacting a starting foamable liquid or urethane elastomer composition consisting essentially of
   (a) a polyether polyol having an average number of functional groups of 2.5–4.5 and a number average molecular weight of 2000–3500,
   (b) a vinyl monomer-grafted polyol having an average number of functional groups of 2.5–4.0 and the graft ratio is 4–20% by weight,
   (c) a liquid polybutadiene polyol having hydroxyl, terminal group(s), an average number of functional groups of 2.0–3.0 and a number average molecular weight of 2000–7000,
   (d) an organic polyisocyanate,
   (e) a chain extender
   (f) a blowing agent, and
   (g) a urethanation catalyst, in such ratios that the NCO index is within the range of 90–110, and the concentration of the chain extender, based on the total amount of the five components of (a), (b), (c), (d) and (e), is $0.3 \times 10^{-3}$ to $1.5 \times 10^{-3}$ mol/g.

2. The vibration isolator of claim 1, in which the polyether polyol (a) has an average number of functional groups of 2.8–4.0, and a number average molecular weight of 3000–6500.

3. The vibration isolator of claim 1, in which the polyether polyol (a) is selected from the group consisting of glycerin/propylene oxide/ethylene oxide copolymerized adduct, (average number of functional groups=3.0, number average molecular weight=3000), propylene glycol/propylene oxide/ethylene oxide copolymerized adduct (average number of functional groups=2.0, number average molecular weight=4800), and glycerin/pentaerythritol/propylene oxide/ethylene oxide copolymerized adduct (average number of functional groups=3.7, number average molecular weight=5700).

4. The vibration isolator of claim 1, in which the vinyl monomer-grafted polyol (b) has an average number of functional groups of 3.0–3.8 and a graft ratio of 5–17% by weight.

5. The vibration isolator of claim 1, in which the vinyl monomer-grafted polyol (b) is a polyol having a number average molecular weight of 2500–8500 and a hydroxyl value of 20–67, to which at least one vinyl monomer selected from the group consisting of styrene, vinyltoluene, 1-butene, 2-hexene, 1,4-hexadiene, 1,3-butadiene, 3-pentene, vinyl chloride, vinylidene chloride, acrylic acid or methacrylic acid, their alkyl esters, vinyl acetate and acrylonitrile, is grafted.

6. The vibration isolator of claim 1, in which the vinyl monomer-grafted polyol (b) has a number average molecular weight of 2500–8500.

7. The vibration isolator of claim 1, in which the vinyl monomer-grafted polyol (b) is the polypropyleneether glycol having a number average molecular weight of about 5100 and an average number of functional groups of about 3, to which acrylonitrile and styrene are grafted.

8. The vibration isolator of claim 1, in which the liquid polybutadiene polyol (c) has an average number of functional groups of 2.1–2.8 and a number average molecular weight of 2400–5000.

9. The vibration isolator of claim 1, in which the liquid polybutadiene polyol (c) has a hydroxyl content of 0.5–1.0 milliequivalent/g.

10. The vibration isolator of claim 1, in which the liquid polybutadiene polyol (c) is selected from the group consisting of hydroxyl-terminated butadiene homopolymer having an average number of functional groups of 2.2–2.4 and a number average molecular weight of about 2800, hydroxyl-terminated butadiene/styrene copolymer having an average number of functional groups of 2.2–2.4 and a number average molecular weight of about 3500, and hydroxyl-terminated butadiene/acrylonitrile copolymer having an average number of functional groups of 2.5–2.8 and a number average molecular weight of about 4500.

11. The vibration isolator of claim 1, in which, based on the total weight of the polyol components (a), (b) and (c), 15–95% by weight of the polyether polyol (a), 1–60% by weight of the vinyl monomer-grafted polyol (b), and 1–50% by weight of the liquid polybutadiene polyol (c) are used.

12. The vibration isolator of claim 1, in which the organic polyisocyanate (d) is selected from the group consisting of 4,4'-diphenylmethanediisocyanate, naphthylenediisocyanate, tolylenediisocyanate and hexamethylenediisocyanate.

13. The vibration isolator of claim 1, in which the chain extender (e) is selected from the group consisting of ethylene glycol, propylene glycol, propanediol, butanediol, hydroquinone, hydroxyethylquinone ether, methylenebis-(o-dichloroaniline), quadrol, ethylenediamine and triethanolamine.

14. The vibration isolator of claim 1, in which the chain extender (e) is contained in the starting foamable liquid at a concentration of, based on the total amount of the five components (a), (b), (c), (d) and (e), $0.5 \times 10^{-3}$ mol/g–$1.2 \times 10^{-3}$ mol/g.

15. The vibration isolator of claim 1 having a bulk density of 0.5–0.7 g/cm$^3$.

16. The vibration isolator of claim 1 in which the polyether polyol (a) has an average number of functional groups of 2.8–4.0, and a number average molecular weight of 3000–6500; the vinyl monomer-grafted polyol (b) has an average number of functional groups of 3.0–3.8 and a graft number of 5–17% by weight and a number average molecular weight of 2500–8500; and the liquid polybutadiene polyol (c) has an average number of functional groups of 2.1–2.8 and a number average molecular weight of 2400–5000 and a hydroxyl content of 0.5–1.0 milliequivalent/g.

17. The vibration isolator of claim 16 wherein the polyether polyol (a) is selected from the group consisting of glycerin/propylene oxide-ethylene oxide copolymerized adduct (average number of functional groups=3.0, number average molecular weight=3000), propylene glycol/propylene oxide/ethylene oxide copolymerized adduct (average number of functional groups-2.0, number average molecular weight=4800), and glycerin/pentaerythritol/propylene oxide/ethylene oxide copolymerized adduct (average number of functional groups=3.7, number average molecular weight=5700); the vinyl monomer-grafted polyol (b) is a polyol having a number average molecular weight of 2500–8500 and a hydroxyl value of 20–67, to which at least one vinyl monomer selected from the group consisting of styrene, vinyltoluene, 1-butene, 2-hexene, 1,4-hexadiene, 1,3-butadiene, 3-pentene, vinyl chloride, vinylidene chloride, acrylic acid or methacrylic acid, their alkyl esters, vinyl acetate and acrylonitrile, is grafted; and the liquid polybutadiene polyol (c) is selected from the group consisting of hydroxyl-terminated butadiene homopolymer having an average number of functional groups of 2,2–2,4 and a number average molecular weight of about 2800, hydroxyl-terminated butadiene/styrene copolymer having an average number of functional groups of 2,2–2.4 and a number average molecular weight of about 3500, and hydroxyl-terminated butadiene/acrylonitrile copolymer having an average number of functional groups of 2.5–2.8 and a number average molecular weight of about 4500.

18. The vibration isolator of claim 17 in which, based on the total weight of the polyol components (a), (b) and (c), 15–95% by weight of the polyether polyol (a), 1–60% by weight of the vinyl monomer-grafted polyol (b) and 1–50% by weight of the liquid polybutadiene polyol (c) are used.

19. The vibration isolator of claim 18 in which the organic polyisocyanate (d) is selected from the group consisting of 4,4'-diphenylmethanediisocyanate, naphthylene-diisocyanate, tolylenediisocyanate and hexamethylenediisocyanate; the chain extender (e) is selected from the group consisting of ethylene glycol, propylene glycol, propanediol, butanediol, hydroquinone, hydroxyethylquinone ether, methylenebis-(o-dichoroaniline), quadrol, ethylenediamine and triethanolamine, and is contained in the starting foamable liquid at a concentration of, based on the total amount of the five components (a), (b), (c), (d) and (e), $0.5 \times 10^{-3}$ mol/g-$1.2 \times 10^{-3}$ mol/g.

20. The vibration isolator of claim 19, in which, based on the total weight of the polyol components (a), (b) and (c) 50–90% by weight of the polyether polyol (a), 2–30% by weight of the vinyl monomer-grafted polyol (b) and 3–30% by weight of the liquid polybutadiene polyol (c) are used.

21. The vibration isolator of claim 19 wherein the mixing ratio of the graft polyol (b) to the polybutadiene polyol (c) is from 1/0.5 to 1/1.5 and the mixing ratio of the polyether polyol (a) to the polybutadiene polyol (c) is within the range of 3/1 to 15/1.

22. The vibration isolator of claim 1 wherein in the starting foamable liquid urethane elastomer composition the graft polyol (b) has a graft ratio of 10–15%, a number average molecular weight of 5000–7000 and an average number of functional groups of 3.0–3.8 and the liquid polybutadiene polyol (c) has a number average molecular weight of 2500–4800 and an average number of functional groups of 2.2–2.8, the polyol (b) and the polyol (c) being present at a blend ratio (b)/(c) within the range of 1:0.5 to 1:1.5.

23. The vibration isolator of claim 22 wherein the amount of the liquid polybutadiene polyol (c) is from 3 to 30% by weight based on the total weight of the polyol components (a), (b) and (c).

24. The vibration isolator of claim 1 having a bulk density of from 0.5–0.7 g/cm$^3$, permanent compression set not more than 5%, a spring constant of from 0.7–5 tons/cm, a tensile strength of at least 10 kg/cm$^2$, an elongation of 100–200%, a fatigue resistance, in terms of the amount of fatigue, of not more than 0.2 mm, and a closed cell forming ratio of from 99–100%.

* * * * *